United States Patent Office 3,376,801
Patented Apr. 9, 1968

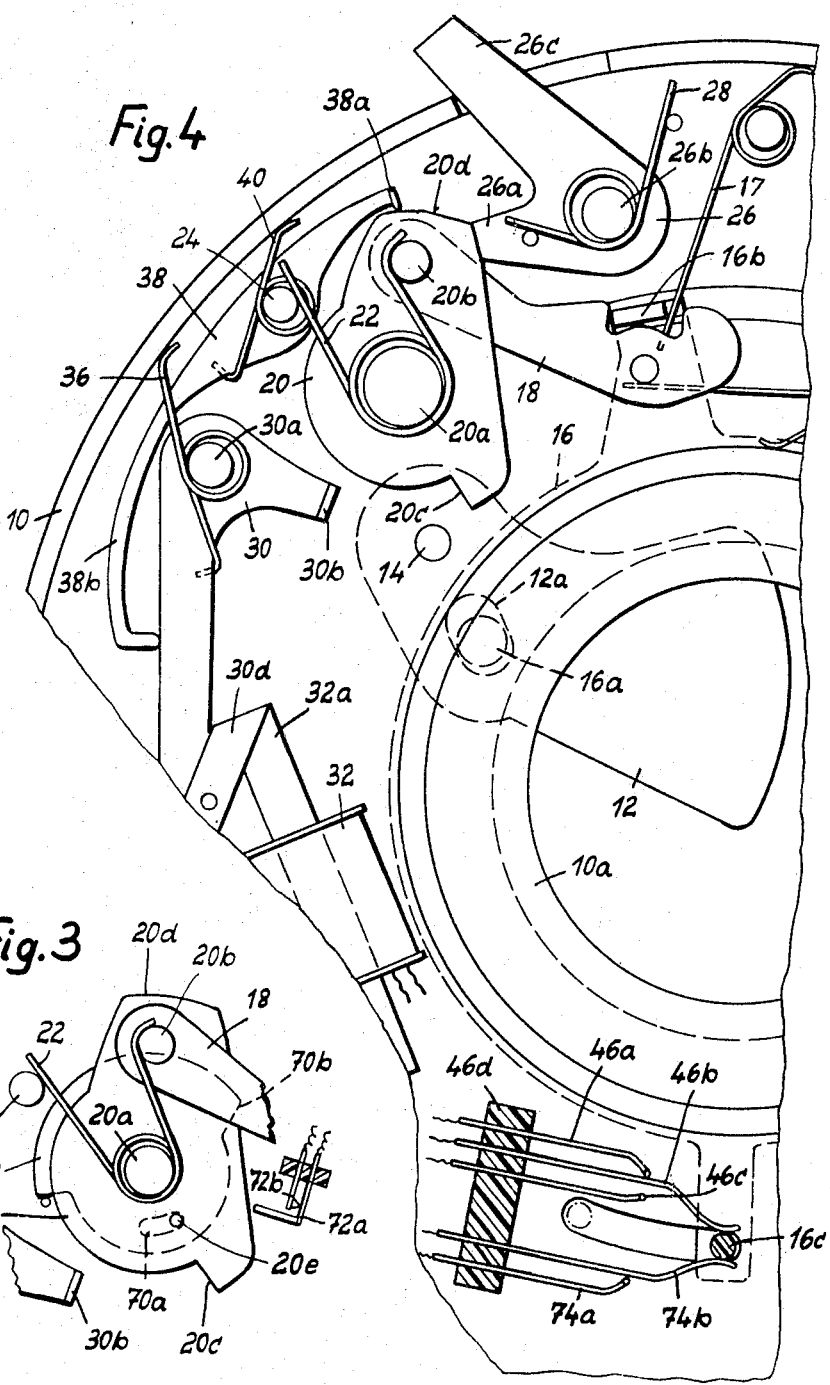

3,376,801
PHOTOGRAPHIC CAMERA
Paul Fahlenberg, Baierbrunn, near Munich, Germany, assignor to Compur-Werk Gesellschaft mit beschrankter Haftung & Co., Munich, Germany, a German firm
Filed June 29, 1965, Ser. No. 468,058
Claims priority, application Germany, July 2, 1964, C 33,303
2 Claims. (Cl. 95—53)

ABSTRACT OF THE DISCLOSURE

There is disclosed a photographic shutter having a master member which runs down from a tensioned position to a rest position, and serves during the running down movement to open and close shutter blades. During the running down movement, while the shutter blades are fully open, the progress of the master member is temporarily stopped by one arm of a latch lever, another arm of which carries an armature cooperating with an electromagnet which, when energized, keeps the lever in effective latching position. An electronic circuit including two transistors energizes the electromagnet to keep the latch lever in the latching position for a variable time depending on the desired duration of the photographic exposure, and then the lever is released so that the master member may resume its running down movement and close the shutter blades.

---

This invention relates to a photographic camera having a shutter in which the shutter speed or duration of exposure is controlled at least in part by a magnet and an electronic circuit for controlling the magnet.

An object of the invention is the provision of a generally improved and more satisfactory camera of this kind.

Another object is the provision of an improved magnet arrangement for determining the duration of exposure.

Still another object is the provision of a camera shutter so designed that the full power of the magnet is used only momentarily, and thereafter the magnet is operated at lesser power during the continuance of the exposure, thereby greatly reducing the current consumption of the magnet.

A further object is the provision of improved circuit means and switching means for controlling the operation of an electromagnet in a photographic shutter.

These and other desirable objects may be attained in the manner disclosed as an illustrative embodiment of the invention in the following description and in the accompanying drawings forming a part hereof, in which:

FIG. 3 is a detail similar to a fragment of FIG. 1, illustrating a modified detail;

FIG. 4 is a view similar in general to FIG. 1, illustrating an alternative embodiment.

The following disclosure presupposes that the reader is already familiar with modern photographic shutters of the objective type, and so the description and the illustration will omit many parts which are actually present in the shutter but which are well known or conventional and therefore familiar to the skilled reader.

Figure 1:
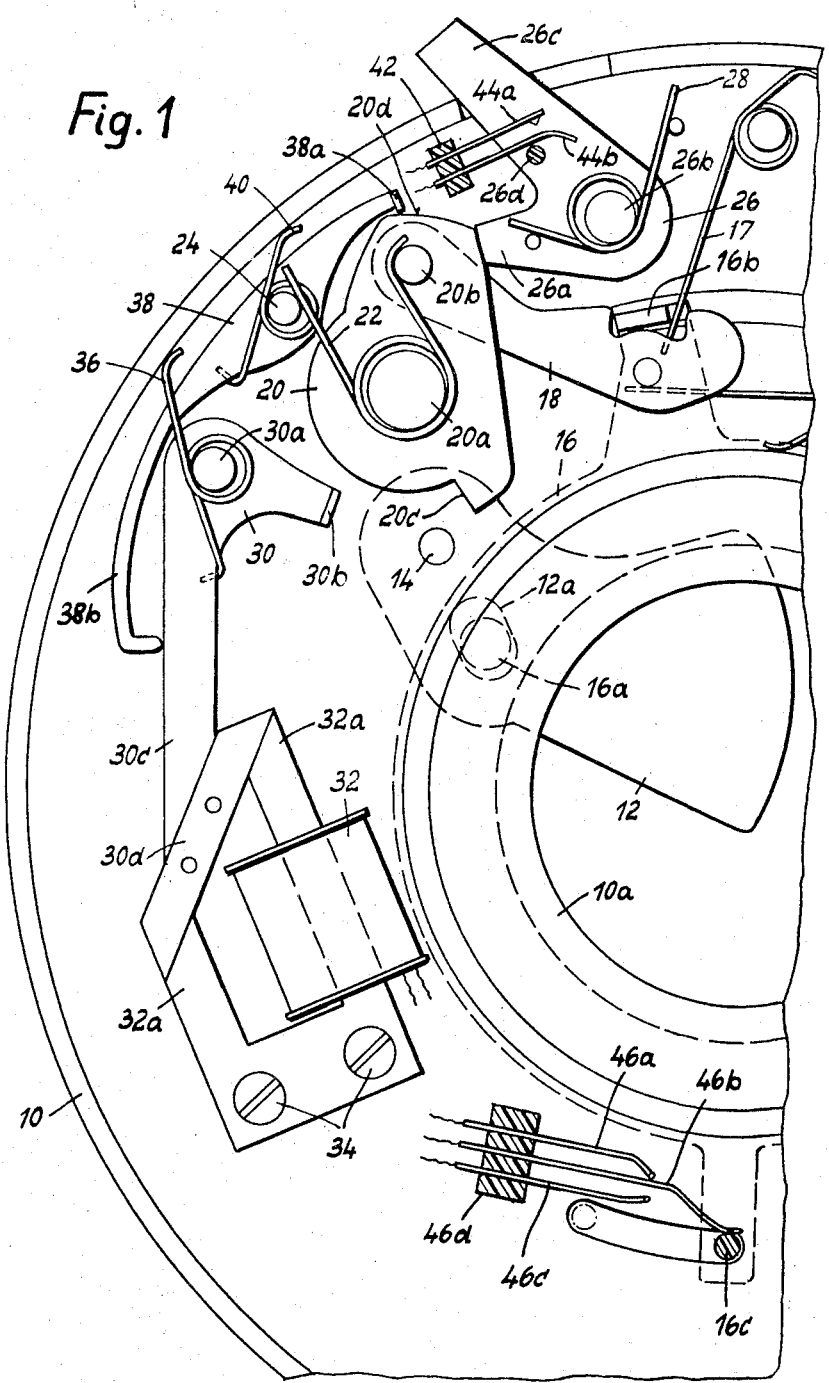
FIG. 1 is a fragmentary front view of a photographic shutter in accordance with the present invention, with the front cover parts removed in order to show the interior parts, and with parts omitted.

In the preferred form of shutter as illustrated in FIG. 1, there is the usual housing or casing of the familiar annular form, indicated in general at 10. The lens tube 10a encircles the optical axis in the usual way and defines the exposure aperture. A plurality of shutter blades 12 extend into the exposure aperture and overlap with each other to close the exposure aperture against passage of light. Any desired number of shutter blades may be used, customarily about five blades, but only one is shown in the drawings, for the sake of simplicity.

Each shutter blade 12 is pivoted in the housing at 14. Each blade also has a control slot 12a. A conventional blade ring 16, rotating about the lens tube 10a, carries pins 16a, one engaging in the control slot 12a of each shutter blade. When the blade ring 16 is in the position shown in FIG. 1, the shutter blades collectively extend across the exposure aperture and close it against passage of light. When the blade ring 16 is turned clockwise from the position shown in FIG. 1, the clockwise movement of the operating pins 16a causes each shutter blade 12 to swing counterclockwise on its pivot 14, to open the shutter blades so that light may pass through the exposure aperture.

The blade ring has a radial arm terminating in an ear or lug 16b engaged by a light spring 17 normally tending to turn the blade ring counterclockwise to keep the blades closed. The lug 16b is also engaged in a notch in one end of the conventional operating link 18, the other end of which is pivoted on a pivot 20b to the main operating member or "master member" 20 which is fixed to a shaft 20a which extends out through the back wall of the shutter housing where the shaft may be operated by any conventional mechanism to turn it (and the master member 20 with it) to cock or tension the master member ready for the next exposure.

The main spring or master spring 22 has one end engaged with a pin on the master member (conveniently the same pin 20b which serves as the pivot for the driving link 18) and the other end engaged with a fixed pin 24 in the shutter housing. This master spring 22 constantly tends to turn the master member 20 in a clockwise direction. In FIG. 1, the master member is illustrated in its cocked or tensioned position, in which position it is held by the latch or trip 26 pivoted in the housing at 26b and having one arm 26a for holding the master member and another arm 26c which extends out through a circumferential slot in the side wall of the housing, to an accessible position where it may be manually moved to release or trip the shutter mechanism so that the master member 20 will run down in a clockwise direction under the influence of the master spring 22. In the familiar manner well understood in the art, the clockwise movement of the master member from the initial tensioned position shown in FIG. 1 will first push the link 18 so that the link pushes the lug or ear 16b on the blade ring 16, to move the blade ring in a clockwise direction to open the shutter blades 12. In the latter part of the running down movement of the master member, the master member will pull leftwardly on the link 18, which will pull the blade ring 16 back in a counterclockwise direction to close the shutter blades. The duration of the exposure can be controlled by blocking or stopping the running down movement of the master member at an intermediate position in which the shutter blades are open, to keep the blades open for the desired length of time before the master member is unblocked to enable it to complete its running down movement and close the shutter blades. It is particularly to the means for blocking and unblocking the running down movement of the master member, that the present invention relates.

A spring 28 tends to hold the latch member or trip member 26 in its latching position.

There is another latching lever 30, made of insulating material, which is associated with the master member 20 and serves to hold the master member in the above mentioned intermediate position in which the shutter blades are open. This latching lever 30 is pivoted at 31a in the housing, and has a first arm 30b which projects into the path of travel of a shoulder 20c on the master member 20. The latch lever 30 also has a second arm 30c which carries a metallic armature 30d which cooperates with a U-shaped magnetic core 32a of an electromagnet, the winding 32 of which is connected into the circuit of an electrical delay arrangement described in more detail below. The magnetic core 32a is fastened to the shutter housing 10 by screws 34, with suitable insulating material interposed. The screw fastening is preferably made adjustable so that the magnetic core 32a may be adjusted to exactly the required position relative to the armature and can be readily set during assembly and thereafter firmly retained in the proper adjusted position. When the armature 30d is in contact with the core 32a of the electromagnet (this being the position shown in FIG. 1) the arm 30b of the latch member 30 blocks the running down movement of the master member in an intermediate position in which the shutter blades are fully open. A spring 36, acting on the latch lever 30, tends to swing the latch lever in a clockwise direction on its pivot 30a, to remove the arm 30b from the path of travel of the master member so the the master member can continue its running-down movement and close the shutter blades.

There is a double armed starting lever 38 pivotally mounted on the pivot pin 24 and loaded by a spring 40 which tends to turn the lever 38 in a clockwise direction. One arm 38a on the starting lever cooperates with a control cam portion 20d on the periphery of the master member 20, while the other arm 38b of the lever 38 bears against the latch lever 30 and urges this latch lever in a counterclockwise direction contrary to the force of the force of the spring 36, thus urging the armature 30d against the magnetic core 32a. The arm 38b of the starting lever 38 is resilient so that, during tensioning or cocking of the shutter, the overtravel caused by the cam 20d of the master member 20 when the armature 30d is already against the holding magnet core 32a, can be absorbed by the inherent resilience of the arm 38b.

In the shutter housing or casing, in the vicinity of the trip or trigger latch 26, is an insulating piece 42 on which electrical contact arms 44a and 44b are supported. These arms are somewhat resilient, and in normal rest position they are separated from each other, as shown. The arm 44b has a curved end which lies in the path of travel of an insulating pin 26d on the trip lever 26. When the trip 26 is operated to release the shutter for making an exposure, the insulating pin 26d engages the switch arm or contact arm 44b and displaces it to make contact with the other arm 44a, thereby closing the switch. This switch is located in an electrical circuit as described in further detail below, in connection with FIG. 2 of the drawings.

There is also another switch in the shutter casing. As shown near the lower part of FIG. 1, three resilient metallic contact members or arms 46a, 46b, and 46c are mounted on an insulating block 46d. The inherent resilience of these arms normally tends to keep the arm 46b in contact with the arm 46c and out of contact with the arm 46a. However, an insulating pin 16c on an arm on the blade ring 16 displaces the arm 46b to hold it out of contact with the arm 46c and in contact with the arm 46a, when the blade ring is in the position shown in FIG. 1, with the shutter blades closed. As the blade ring turns clockwise from the position shown in FIG. 1, to open the blades, the switch arm 46b opens contact with the arm 46a and closes contact with the arm 46c. This switch, which may be referred to as a change-over switch, is also arranged in the electrical circuit in the manner described below in connection with FIG. 2.

The shutter is equipped with an electrical delay arrangement which controls the period of exposure by controlling the length of time that the arm 30b blocks the running down movement of the master member 20 at an intermediate position in which the blades are open. The electrical delay arrangement includes an electric battery and a resistance-capacitance portion or member, sometimes abbreviated as a R.C. member or portion.

Figure 2:
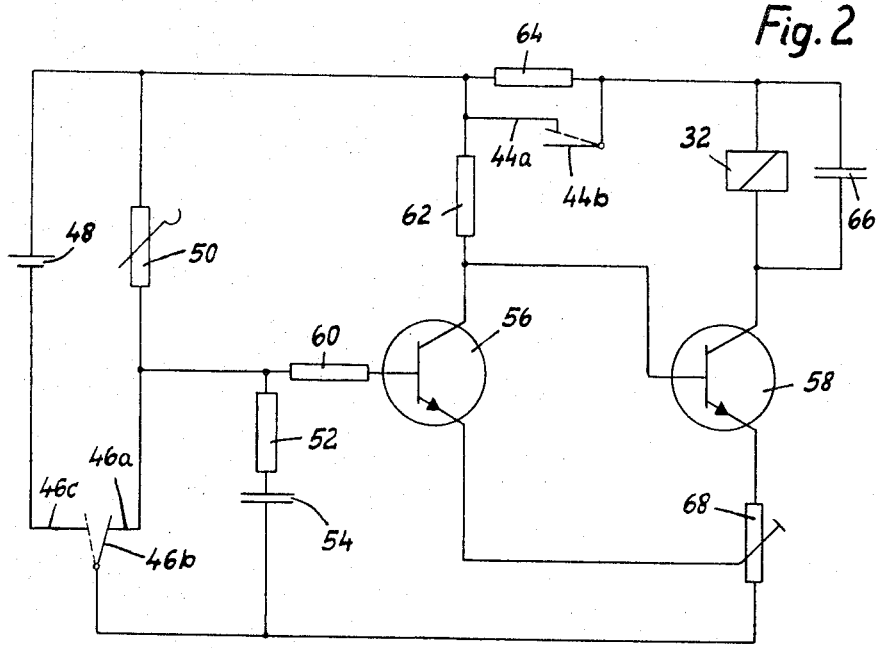
FIG. 2 is a schematic wiring diagram of a preferred form of circuit connections used in the embodiment of the invention illustrated in FIG. 1.

Reference is now made to FIG. 2, which is a schematic wiring diagram illustrating the circuit connections. Current is supplied by a battery 48 which, through an adjustable resistor 50 and a limiting resistor 52, charges the exposure period determining condenser or capacitor 54. The circuit further includes transistors 56 and 58, a protective resistor 60, a collecting resistor 62, a compensating or threshold resistor 64, and a blow-out condenser or capacitor 66 arranged in parallel or shunt around the winding 32 of the electromagnet. There is also a setting potentiometer 68 for adjusting the period of control.

The change-over switch 46a, 46b, 46c is incorporated in the delay circuit in the manner clearly apparent from the wiring diagram. The resistor 64 is used to reduce the current consumption, and the previously mentioned switch 44a, 44b is arranged in parallel or shunt around it, as clearly shown.

If the exposure time is to be set by hand, the resistor 50 is a manually adjustable resistor, having a scale marked with shutter speeds or exposure periods. If the exposure time is to be set automatically, then the resistor 50 is a photo resistance element which responds to the brightness of the photographed subject.

In the position illustrated in FIGS. 1 and 2, the shutter is cocked or tensioned and the battery is disconnected from the delay arrangement or shutter speed controlling arrangement, by reason of the position of the switch member 46b. Also, at this time, the cam portion 20d on the master member 20 holds the starting lever 38 in a position to press the armature 30d against the core 32a of the holding magnet, notwithstanding the tendency of the spring 36 to separate the armature from the core. The magnetic winding 32 is, however, dead or ineffective at this time, and the switch 44a, 44b is open.

When the trip or trigger 26 is operated to initiate an exposure, the pin 26d closes the switch 44a, 44b, thereby short circuiting the resistor 64. The master member 20 is released and begins to run down in a clockwise direction under the influence of the master spring 22. Accordingly, the master member pushes on the link 18, which turns the blade ring 16 to the right or clockwise, opening the shutter blades 12. Right at the beginning of the movement of the blade ring 16, the pin 16c releases the switch arm 46b of the change-over switch so that contact is now made between 46b and 46c, thereby applying the current from the battery 48 to the electrical control connections.

The emitter conductors of the two transistors 56 and 58 are thus connected to the battery 48, and the short-circuiting of the time-determining capacitor 54 is thus broken. Since the base of the transistor 56 is at a potential under that of its emitter, as determined by the transistor 58, the transistor 56 is completely blocked at the instant that the switching-in of the delay control circuit takes place, so that the base of the transistor 58 is connected to the battery 48 through the resistor 62. The collector current which consequently flows through the transistor 58 energizes the holding magnet winding 32, so that the armature 30d is held for a brief period after the switching instant, by the complete holding force of the magnet with full current. During the brief interval before the magnet winding 32 becomes energized to hold the armature, the armature has been held in contact with the magnet core 32a by the lever 38, since the parts are so shaped that the cam 20d on the master member 20 does not release the lever 38 until the master member has moved far enough to cause the blade ring 16 to move far enough to operate the switch 46b to initiate the above mentioned action for energizing the magnet winding 32.

Because the magnet winding 32 is energized and holds the latch 30 in position to obstruct the master member 20, the master member runs down to an intermediate position in which the shutter blades 12 are open, and then the motion of the master member stops because the shoulder or abutment 20c thereon engages the arm 30b on the latch 30. The shutter blades thus remain open until the magnet 32 is de-energized, enabling the latch 30 to move to an ineffective position.

When the change-over switch member 46b is changed from 46a to 46c, a charging current also begins to flow into the capacitor 54, and this continues until the base of the transistor 56 exceeds its emitter voltage. At this instant, the transistor 56 becomes conductive and there is a slight voltage drop at the resistor 62. The conductivity of the transistor 58 thus decreases a slight amount, as a result of which the voltage drop at the potentiometer 68 also falls slightly, because the current of the input transistor 56 is slightly smaller by the amplifying feature of the two transistors and the first then has no influence on the potentiometer 68. The emitter voltage of the transistor 56 is reduced, and the voltage difference between the base and emitter of this transistor increases, especially as the voltage at the capacitor 54 is further increased in the meantime. The now increased current flow in the transistor 56 becomes effective in the manner already described above, but through the reaction coupling, so that the current avalanches in the transistor 56 and at the same time drops equally abruptly in the transistor 58. The transistor 56 thus becomes conductive while the transistor 58 is blocked.

As soon as the current flow through the transistor 58 ceases, the flow of current through the magnet winding 32 also ceases. The spring 36 can now move the latching lever 30 in a clockwise direction, thereby shifting the arm 30b out of latching engagement with the nose or shoulder 20c of the master member 20. This releases the master member so that, under the influence of the master spring 22, it can now resume its turning movement in a clockwise direction, running down to the final rest position determined by a suitable stop. During the resumed movement of the master member, it pulls leftwardly on the link 18, thereby moving the blade ring 16 in a counterclockwise direction to close the shutter blades, thus terminating the exposure after a period of time determined by the resistance value of the resistor 50.

During the return of the blade ring 16 to the rest position (which is identical with the initial tensioned or cocked position of the blade ring, shown in FIG. 1) the pin 16c operates the change-over switch 46b to move it out of contact with the switch member 46c and into contact with the switch member 46a. As a result, the current supply from the battery to the emitter conductors of both transistors 56 and 58 is interrupted, and the capacitor 54 is discharged through the resistor 52.

The resistor 64, which serves for reduction of the current consumption, remains short-circuited by the switch parts 44a, 44b so long as the trip or release member 26 remains actuated. Thus the resistor 64 is ineffective, and does not reduce the current which would otherwise flow through the winding 32, while the operator keeps pressing on the trip 26. But when the operator releases the trip 26, its restoring spring 28 produces a return movement of the trip or latch lever 26 in a counterclockwise direction until it bears against the periphery of the main driving member or master member 20, and in this position the switch 44a, 44b is open, so that the resistor 64 now comes into operation to reduce the flow of current through the winding 32. This flow may be reduced, for example, to approximately one-third of the current flow existing when the switch is closed and the resistor 64 is short-circuited.

The running down movement of the master member 20, from the time it is released by sufficient movement of the trip latch 26 until the time it reaches the intermediate position with the shutter blades fully open, lasts for about 10 milliseconds, for example. Since the time required to operate the latch or trip 26 and then release it for return movement is substantially longer than this (for example, at least 30 milliseconds) it follows that the current reducing resistor 64 does not become effective until after the master member 20 has actually made engagement with the latching lever 30. From this it follows that at the time the master member hits against the latching lever 30, the latching lever will be held against displacement by the full power of the magnet 32, with full current flowing therein. It is only when the master member has come to rest against the latching lever 30 and the initial impact has already occurred, that the resistor 64 will become effective to reduce the flow of current through the magnet winding 32, maintaining sufficient attraction power in the magnet to hold the lever 30 under the prevailing conditions, although the reduced holding power of the magnet might not have been sufficient to maintain the latch lever in proper condition at the initial impact of the master member against the latch lever.

The reduction in current consumption is of particular importance where long exposure periods are concerned, because in these circumstances the armature has to be held by the holding magnet for a long time. Similar conditions apply to "time" or "bulb" photographs because in these instances, the resistor 50 is set to such a high resistance value, or infinity, that the capacitor 54 will not be charged. A continuous current, therefore, flows through the transistor 58 and the winding 32 until the shutter is closed, a smaller resistance being for example incorporated as the resistor 50. So with the present arrangement, there is a considerable reduction in current consumption especially when the camera is used frequently for time exposures or for internally timed exposures of relatively long duration such as one second, ½ second, or ¼ second. This enables a longer life for a battery of given size, or enables the use, with equal life, of a smaller and less powerful battery.

FIG. 3 illustrates another possible embodiment of a switch for short-circuiting the resistor 64 to provide maximum current flow initially, while making the resistor 64 effective to reduce the current flow after the beginning of the exposure cycle. In this embodiment shown in FIG. 3, a flywheel disk 70 is mounted for free rotation on the shaft 20a, beneath the master member 20. The flywheel disk 70 has an arcuate slot 70a, in which is engaged a pin 20e on the master member, to limit the extent to which the flywheel disk 70 can turn relative to the master member. The disk 70 also has a projection 70b, in the path of travel of which is an arm on a switch contact member 72a which cooperates with the other contact member 72b. This switch 72a, 72b replaces the switch 44a, 44b previously described. The other parts, and the circuit arrangement, are the same as previously described.

In this embodiment, when the shutter is tensioned or cocked, the switch 72a, 72b is closed and the resistor 64 is thereby short-circuited. When the shutter is released and the main driving member or master member 20 runs down toward the intermediate shutter-open position, the flywheel disk 70 will be rotated along with the master member 20 after an idle motion determined by the length of the slot 70a. During this time, the switch 72a, 72b will remain closed and the resistor 64 will be short-circuited, so that maximum current flows through the magnet winding. However, when the shoulder 20c on the master member 20 strikes the latching arm 30b and abruptly stops the running-down motion of the master member with the shutter blades in an open position, the flywheel disk 70 will continue to travel a further angular amount beyond the position in which the master member stops, by virtue of the lost motion allowed by the slot 70a, and during this lost motion the projection 70b on the flywheel disk or inertia member will engage the contact spring 72a and will open the switch 72a, 72b. Consequently the resistor 64 will no longer be short-circuited, but will come into effect shortly after the master member has struck the latching lever 30, and this automatically reduces the current consumption regardless of whether the operator does or does not keep his finger on the trigger 26.

Figure 5:
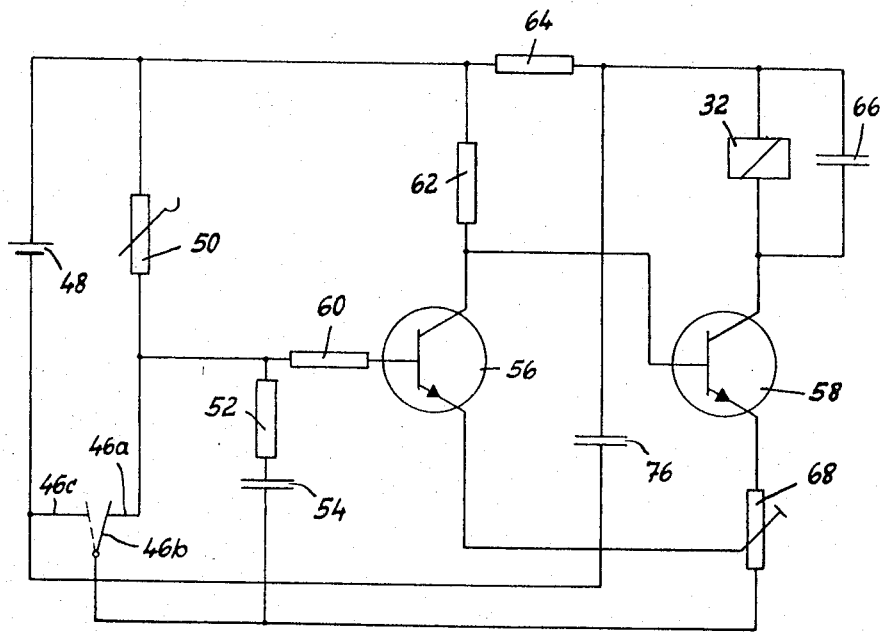
FIG. 5 is a schematic wiring diagram of a circuit arrangement for use with the structure shown in FIG. 4.

A further embodiment of the invention is shown in FIGS. 4 and 5. FIG. 4 illustrates the fact that the switch 44a, 44b is no longer present. The resistor 64 is in the circuit of the winding 32 at all times, and there is no provision for short-circuiting it. The function of providing greater flow of current through the winding during the early part of operation is here performed by a capacitor, rather than by short-circuiting the resistor. This is illustrated in FIG. 5, where it is seen that the capacitor 76 is behind the resistor 64. Other parts of the circuit in FIG. 5 have the same reference numerals as the corresponding parts in FIG. 2, and require no additional description.

With this arrangement, the resistor 64 and the capacitor 76 are at all times in a closed circuit with the battery 48, so that the capacitor is normally fully charged. At the beginning of the exposure operation, when the change-over switch 46b moves from contact with 46a to make contact with 46c, the capacitor 76 is placed in the circuit through the transistor 58 to the electromagnet 32. Therefore, when the switch of this circuit is closed (i.e., when the transistor 58 becomes conductive) the current flowing through the winding 32 will be the sum or combination of the battery current as limited by the resistor 64, plus the current from the capacitor 76. The battery current will remain substantially constant, while the capacitor current will start at a peak and rapidly diminish. At the start, while the capacitor is discharging, there will be a large current through the winding, giving additional holding power or attraction to the armature 30d at the time of impact of the master member shoulder 20c against the latch part 30b. When the discharge of current from the capacitor 76 has been completed, only the battery current through the resistor 64 will thereafter flow through the winding 32, so long as the transistor 58 remains conductive, and will stop when this transistor becomes non-conductive.

FIG. 4 also illustrates the fact that additional switching means may be operated from the same pin 16c which operates the change-over switch 46b. In the circuit arrangement as described in connection with FIG. 5, no such additional switching means is needed. But if it is desired to have an additional switch, e.g. to operate or to stop operation of any supplementary equipment such as might be used with a special-purpose camera for technical or scientific photography, then additional switch members may be operated from the same pin 16c, as shown at 74a and 74b.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising an operating member movable through a running-down movement from a tensioned position to a run-down position and effective during running-down movement to open and close the shutter, a first latch for holding said operating member in its tensioned position, a second latch for stopping running-down movement of said operating member at an intermediate position in which said shutter is open and holding said operating member in said intermediate position, a spring tending to move said second latch to an unlatching position, an electromagnetic winding for holding said second latch in effective latching position against the force of said spring, and electric circuit means set into operation by running-down movement of said operating member for supplying current to said winding, said circuit means including timing means for stopping flow of current to said winding after a time interval so that said spring may then move said second latch to unlatching position so that said operating member may resume and complete its running-down movement, the shutter further including means operated by movement of said operating member from run-down position to tensioned position for moving said second latch from unlatching position to latching position against the force of said spring.

2. A construction as defined in claim 1, further including means for reducing flow of current to said winding after the running-down movement of said operating member has been stopped by said second latch and before said timing means completely stops flow of current to said winding.

References Cited

UNITED STATES PATENTS

| 3,063,354 | 11/1962 | Matulik | 95—53 X |
| 3,095,795 | 7/1963 | Yates | 95—53 |
| 3,241,471 | 3/1966 | Burgarella | 95—55 |

JOHN M. HORAN, *Primary Examiner.*